United States Patent [19]
Norton et al.

[11] 3,887,605

[45] June 3, 1975

[54] PROCESS FOR RECOVERY OF 2,6-DICYANONAPHTHALENE

[75] Inventors: Richard V. Norton, Wilmington, Del.; Howard P. Angstadt, Media, Pa.

[73] Assignee: Sun Ventures, Inc., St. Davids, Pa.

[22] Filed: Jan. 10, 1974

[21] Appl. No.: 432,369

[52] U.S. Cl. .......................... 260/465 C; 260/465 H
[51] Int. Cl. ........................................... C07c 121/62
[58] Field of Search ..................... 260/465 C, 465 H

[56] References Cited
UNITED STATES PATENTS
3,472,891   10/1969   Ikeda et al. .......................... 260/465

*Primary Examiner*—Lewis Gotts
*Assistant Examiner*—Dolph H. Torrence
*Attorney, Agent, or Firm*—George L. Church; Donald R. Johnson; Paul Lipsitz

[57] ABSTRACT

In the process of separating 2,6-dicyanonaphthalene from a gaseous ammoxidation product stream, the improvement which comprises cooling said hot product stream to a temperature above about 240°C. and below about 300°C. and separating condensed solid crystals of high purity 2,6-dicyanonaphthalene in high yield.

2 Claims, No Drawings

PROCESS FOR RECOVERY OF 2,6-DICYANONAPHTHALENE

It is known in the art of ammoxidation where an alkylsubstituted hydrocarbon such as p-xylene is converted to the corresponding nitrile by catalytic reaction with ammonia and oxygen, that the product gas may be cooled to condense the nitrile product (U.S. Pat. No. 3,472,891). Where the hydrocarbon contains more than one alkyl group the nitrile so obtained will contain mono- and polynitriles and if the polynitrile is the desired product the mononitrile must be removed. In the ammoxidation of 2,6-dimethylnaphthalene to 2,6-dicyanonaphthalene is an intermediate to 2,6-diaminomethylnaphthalene useful in dyes and as a polymer intermediate, the product dinitrile will contain unreacted 2,6-dimethylnaphthalene as well as by-product 2-methyl-6- cyanonaphthalene. It is important, of course, to be able to separate the desired dinitrile from the unwanted materials in the most efficient manner.

It has now been found that a high purity 2,6-dicyanonaphthalene product may be isolated from the gaseous ammoxidation product stream in good yield simply by quenching (i.e., cooling) the stream to a temperature within a narrow temperature range, namely, above about 240°C. and below about 300°C., and separating the condensed solid dinitrile product which forms.

It will be understood that various means may be used to cool the ammoxidation product stream and separate the crystalline product. For example, cooling within a container having scraper blades may be used. More efficiently, the hot ammoxidation product stream may be fed into a helical screw cooled to condense the vapors at a temperature above about 240°C. and below about 300°C. and feed the solid product to a receiver by screw rotation. In a preferred technique a cooling gas such as steam at high velocity is introduced into the ammoxidation stream effecting condensation in the fluid gas phase, thereby minimizing wall deposits, and the product 2,6-dicyanonaphthalene is separated at the above effective temperature with a cyclone or similar device. Other devices and techniques will be obvious to those skilled in the art. The process of the invention is dependent upon cooling the gaseous ammoxidation stream and obtaining the solid 2,6-dicyanonaphthalene product which separates from the cooled vapors. No cooling or quenching liquid is employed which comes in contact with the gaseous stream or the product. Thus, separation of the product without any liquid contamination is easily achieved.

The process of this invention is applicable to any vapor phase ammoxidation of 2,6-dimethylnaphthalene and this will include those ammoxidation procedures with and without oxygen and with any of the numerous catalysts useful in such processes (e.g., vanadium oxides, molybendum oxides and the like). Also, the vapor phase ammoxidation may be carried out in a fixed bed, moving bed, fluidized bed or other type of reaction means for obtaining contact of the reactant vapors with the catalyst. Examples of typical ammoxidation procedures are set forth in U.S. Pat. NO. 3,478,082 (Huibers, issued Nov. 11, 1969), U.S. Pat. No. 3,079,422 (Pasky, issued Feb.26, 1963), and U.S. Pat. No. 3,501,517 (Hughes et al, issued Mar. 17, 1970). Usually, the major by-product impurity in such ammoxidation streams will be 2-methyl-6-cyanonaphthalene due to the incomplete ammoxidation of the starting material and the amount of such by-product will vary over a wide range depending upon the particular process conditions of the reaction. Generally, however, the amount of such impurity will be from about 20 to 70 mole percent based on the total on the total nitrile products. It will also be understood that unreacted hydrocarbon, ammonia and air (if used) will also be in the product stream, but these materials remain in the vapor phase and cause no difficulty during the separating out of the solid product 2,6-dicyanonaphthalene.

In order to further illustrate the invention, the following examples are given:

EXAMPLES

An ammoxidation product stream was obtained from an ammoxidation reactor where 2,6-dimethylnaphthalene, $NH_3$ and air were reacted at 400°C. using a $V_2O_5$ catalyst supported on silica. The stream was comprised essentially of gaseous, 2,6-dimethylnaphthalene (2,6-DMN), $CO_2$, 2-methyl-6- cyanonaphthalene (2,6-MCN), and 2,6-dicyanonaphthalene (2,6-DCN) and was fed at the effluent temperature of about 400°C. trhough a 4 inch section of a thermostated 1 inch diameter glass pipe where condensation occured, the temperature of condensation being determined by a thermocouple within the pipe. After condensation of each batch run, the dinitrile product was removed from the pipe and weighed. The temperture of cooling was controlled by adjusting the heat input to the glass pipe. The following table indicates the results obtained:

TABLE I

| Quench Temp. (°C) | Composition of Crystalline Product | | | Wt. % Recovery |
|---|---|---|---|---|
| | 2,6-DCN | 2,6-MCN | 2,6-DMN | |
| 300° | 99% | <1% | <1% | 80% |
| 280° | 99% | <1% | <1% | 85% |
| 275° | 98% | 1% | 1% | 90% |
| 260 | 97–99% | 1–2% | 1% | 90% |
| 240° | 96% | 3% | 1% | 95+% |
| 225° | 80% | 18% | 2% | 95+% |
| 200° | 70% | 25% | 5% | 95+% |
| 180° | 60% | 35% | 5% | 95+% |
| 100° | 60% | 35% | 5% | 95+% |

It is apparent from the above data the the process of this invention employing condensation of the ammoxidation effluent at about 240°to about 300°C. yields a relatively pure 2,6-dinitrile. Also, as can be seen, the highest purity product is obtained at the highest temperature (e.g. about 300°C) but at this high temperature the recovery suffers somewhat. A preferred temperature range for the process of the invention is from about 260°to about 300°C., most preferably, about 275°to 280°C.

The invention claimed is:

1. In the process of separating 2,6-dicyanonaphthalene from a gaseous ammoxidation product stream, the improvement which comprises cooling said hot product stream to a temperature above 240°C. and below about 300°C. and separating condensed solid crystals of 2,6-dicyanonaphthalene.

2. The process of claim 1 where the amoxidation product stream comprises from about 20% to about 70% methyl cyanonaphthalene and from about 80% to about 30% dicyanonaphthalene based upon the aromatic nitrile content.

* * * * *